United States Patent [19]

Garde

[11] Patent Number: 4,879,093

[45] Date of Patent: Nov. 7, 1989

[54] DUCTILE IRRADIATED ZIRCONIUM ALLOY

[75] Inventor: Anand M. Garde, Simsbury, Conn.

[73] Assignee: Combustion Engineering, Inc., Windsor, Conn.

[21] Appl. No.: 205,775

[22] Filed: Jun. 10, 1988

[51] Int. Cl.$^4$ .................. C21D 1/26; C22C 16/00
[52] U.S. Cl. .................. 420/422; 148/11.5 F; 148/133; 376/410; 376/417
[58] Field of Search .................. 420/422; 148/11.5 F, 148/133; 376/410, 417

[56] References Cited

U.S. PATENT DOCUMENTS

| | | | |
|---|---|---|---|
| 3,261,682 | 7/1966 | Rösler | 420/422 |
| 3,271,205 | 9/1966 | Winton et al. | 420/422 |
| 4,065,328 | 12/1977 | Cheadle | 420/422 |
| 4,212,686 | 7/1980 | Lunde et al. | 420/422 |
| 4,584,030 | 4/1986 | McDonald et al. | 148/11.5 F |
| 4,775,508 | 10/1988 | Sabol et al. | 420/422 |

*Primary Examiner*—Upendra Roy
*Attorney, Agent, or Firm*—John H. Mulholland

[57] ABSTRACT

A stabilized alpha metal matrix provides an improved ductility after irradiation without loss of corrosion resistance in a "Zircaloy" alloy modified with measurable amounts of up to 0.6 percent by weight of niobium or 0.1 percent by weight of molybdenum. Tin is present in the Zircaloy in the range of 1.2 to 1.70 percent by weight and the oxygen level is in the range of from 1000 to 1600 ppm. Iron and chromium alloying element levels are those of typical Zircaloys. The average intermetallic precipitates' particle sizes are in the range of from 1200 to 1800 angstroms, thereby providing optimum corrosion resistance of the improved alloy in both boiling water and pressurized water reactors.

2 Claims, No Drawings

DUCTILE IRRADIATED ZIRCONIUM ALLOY

BACKGROUND OF THE INVENTION

1. Field of the Invention

The invention relates to alloys for use in light water nuclear reactor (LWR) core structural components and fuel cladding.

2. Description of the Prior Art

Zirconium alloys, particularly those commonly known as Zircaloy 2 and Zircaloy 4, are used in light water reactor cores because of their relatively small capture cross-section for thermal neutrons. The addition of 0.5 to 2.0 percent by weight niobium and up to 0.25 percent of a third alloying element to these zirconium alloys for purposes of corrosion resistance in the reactor core is suggested in U.S. Pat. No. 4,649,023 as part of a teaching of producing a microstructure of homogeneously dispersed fine precipitates of less than about 800 angstroms. The third alloying element is a constituent such as iron, chromium, molybdenum, vanadium, copper, nickel and tungsten.

Pellet-clad interaction (PCI) resistance is sought in U.S. Pat. Nos. 4,675,153 and 4,664,881 by use of zirconium based alloys including "zirconium-2.5 w/o niobium". The latter teaching also refers to "Zr-Nb alloys containing about 1.0 to 3.0 w/o Nb". In these patents, oxygen is present "below about 350 ppm of said alloy".

U.S. Pat. No. 4,648,912 teaches improving high temperature corrosion resistance of an alpha zirconium alloy body by rapidly scanning the surface of the body with a laser beam. The alloys treated included zirconium-niobium alloys.

It has been found by various investigators in the prior art literature that the addition of niobium to a zirconium alloy for use in light water reactors will reduce hydrogen uptake from waterside corrosion, stabilize oxygen-irradiation defect complexes and make the alloy more resistant to annealing of irradiation damage. It is also reported by investigators that niobium will enhance work hardenability of irradiated Zircaloy but that an addition of niobium above the 1 percent level will not result in further additional benefit in mechanical properties.

SUMMARY OF THE INVENTION

The present invention relates to an improved ductile zirconium-tin (Zircaloy)-niobium or molybdenum alloy for use in light water nuclear reactor core structural components and fuel cladding. The longer in-reactor residence times and extended fuel burnup—above 55 GWD/MTU—are possible because the stabilized microstructure minimizes loss of alloy ductility. An improved ductility is required to resist loss of fission gases and to handle spent fuel safely. At the same time, the alloy retains a reasonable corrosion resistance in both pressurized water reactors (PWR) and boiling water reactors (BWR) because of its optimum intermetallic precipitate average particle s(ze.

The alloy of the invention is based on an alpha phase zirconium-tin-niobium or alpha phase zirconium-tin-molybdenum alloy. The niobium, if present, is in a range of from a measurable amount up to 0.6 percent by weight. The molybdenum, if present, is in a range of from a measurable amount up to 0.1 percent by weight. The zirconium-tin system is known as "Zircaloy" and, typically, if Zircaloy-4, for example, would also have 0.18 to 0.24 percent by weight iron, 0.07 to 0.13 percent by weight chromium, oxygen in the range of from 1000 to 1600 ppm, 1.2 to 1.7 percent by weight tin, and the remainder zirconium.

DESCRIPTION OF THE PREFERRED EMBODIMENTS

The invention is based on the theory that ductility after irradiation is improved by increasing the stability of an irradiated alpha metal microstructure of a Zircaloy-2 or Zircaloy-4 alloy against deformation. The microstructural stability is improved by the addition of measurable amounts of either niobium up to 0.6 percent by weight or molybdenum up to 0.1 percent by weight. The niobium or molybdenum is homogeneously dissolved in the alpha phase Zircaloy.

The following Table I shows the constituent range of Zircaloy-2 on the left under "Range" and a typical Zircaloy-2 example just to the right, under "Typical". Zircaloy-4 and the preferred embodiment are similarly defined.

The addition of niobium in an amount up to 0.6 or molybdenum in an amount up to 0.1 is to ensure an alpha metal matrix for the alloy. The amount of niobium or molybdenum added to the alloy is utilized to stabilize the irradiated alpha-phase microstructures against deformation. This is believed to be the criticality which provides ductility to a highly irradiated Zircaloy structure.

The zirconium alloys currently widely used in nuclear reactor cores of light water reactors, Zircaloy-2 or Zircaloy-4, exhibit low ductility at extended burnups due to embrittlement associated with the synergistic effect of irradiation damage and hydride precipitates. The mechanical loading of irradiated Zircaloy at approximately 300.C leads to localized deformation bands due to dislocation channeling and failure occurs within a band. Hydrides precipitated within a band initiate early failure. The low ductility of Zircaloys has posed a limitation on the burnup and handling capabilities of the current generation nuclear fuel elements and pressure tubes.

The invention of the new alloy described in this disclosure solves these problems. The new alloy has superior ductility at extended burnups and it increases the burnup and handling capabilities of LWR fuel cladding and pressure tubes to extended burnups. The composition of the new alloy is optimized for a satisfactory performance at extended burnups.

TABLE I

| | Zircaloy-2 | | Zircaloy-4 | | Preferred Embodiment Modified Zircaloy | |
|---|---|---|---|---|---|---|
| | Range | Typical | Range | Typical | Range | Typical |
| Tin, Wt % | 1.2 to 1.7 | 1.4 | 1.2 to 1.7 | 1.4 | 1.2 to 1.7 | 1.4 |
| Iron, Wt % | 0.07 to 0.20 | 0.15 | 0.18 to 0.24 | 0.21 | 0.07 to 0.24 | either typical |
| Chromium, Wt % | 0.05 to 0.15 | 0.10 | 0.07 to 0.13 | 0.11 | 0.05 to 0.13 | 0.11 |
| Nickel, Wt % or ppm | 0.03 to 0.08 wt % | 0.06 wt % | 0 to 70 ppm | 30 ppm | 0.00 to 0.08 wt % | either typical |
| Oxygen, ppm | — | 1000 | — | 1200 | 900 to 1600 | either typical |

TABLE I-continued

|  | Zircaloy-2 | | Zircaloy-4 | | Preferred Embodiment Modified Zircaloy | |
| --- | --- | --- | --- | --- | --- | --- |
|  | Range | Typical | Range | Typical | Range | Typical |
| Niobium, Wt % | — | — | — | — | up to 0.6 | 0.6 |

*Niobium can be replaced by Mo. The amount of Mo to be added is limited by the Mo solubility in alpha-Zr, i.e. below ~0.1 Wt % Mo.

Specifically, it results in an adequate corrosion resistance and improved ductility at extended burnups. The new alloy is formed by adding a measureable amount up to 0.6 percent by weight of niobium (or 0.1 percent by weight molybdenum) to Zircaloy-2 and Zircaloy-4. The oxygen level is 900 to 1600 ppm.

Processing currently used in the industry for Zircaloy will be used for the new material of the invention. This includes an intermediate anneal temperature in the range 1200.F to 1420.F to result in the appropriate average intermediate particle size for both BWR and PWR use of the range 1200 to 1800 angstroms.

The addition of less than 0.6% niobium or 0.1% molybdenum (1) to improve microstructural stability against deformation, and (2) to insure an alpha metal matrix to Zircaloy is the novel feature of this invention by which the ductility of highly irradiated modified Zircaloy is improved due to the following factors:

1. Addition of niobium (or Mo) increases the stability of radiation damage so that strength of radiation anneal hardening increases. More effective radiation anneal hardening delays the onset of plastic instability which is otherwise caused by dislocation channeling (plastic deformation restricted to a single channel). Niobium atoms may form complexes with oxygen atoms and defects and thereby expands the temperature range of effective radiation anneal hardening due to oxygen. The same result can be obtained by the addition of molybdenum.
2. Addition of niobium (or Mo) increases the work hardening capability of irradiated Zircaloy so that when the first dislocation channel is formed, work hardening occurs on that channel and continued deformation on that channel is not preferred. This leads to the formation of a new channel or a detour of the deformation and this process repeats to provide an overall increased ductility.
3. Addition of niobium (or Mo) decreases the hydrogen absorption fraction of Zircaloys and thereby decreases the number of hydride precipitates in a dislocation channel. This delays the fracture initiation and propagation within a dislocation channel.

Since the amount of Nb (or Mo) addition is relatively low, the in-reactor corrosion rate of the modified Zircaloy will be similar to that of unmodified Zircaloy.

I claim:

1. An improved ductile modified Zircaloy alloy for use in light water nuclear reactor core structural comonents and fuel cladding which comprises:
    measurable amounts of alloying material from the group of niobium or molybdenum -or combinations thereof, niobium being present in a range up to 0.6 percent by weight or molybdenum being present in a range up to 0.1 percent by weight, said alloying material homogeneously dissolved in alpha Zircaloy with 1.2 to 1.70 percent by weight tin, 0.07 to 0.24 percent by weight iron, 0.05 to 0.13 percent by weight chromium, up to 0.08 percent by weight nickel, and oxygen in the range of from 900 to 1600 ppm.
2. The improved ductile modified Zircaloy alloy of claim 1 in which the average intermetallic precipitates' particle sizes are in the range of from 1200 to 1800 angstroms, thereby providing optimum corrosion resistance in both boiling water and pressurized water reactors.

* * * * *